(12) United States Patent
Kerekes et al.

(10) Patent No.: US 7,441,682 B2
(45) Date of Patent: Oct. 28, 2008

(54) WIRE FEEDING APPARATUS

(76) Inventors: Lajos Kerekes, Felsõdunasor 13, H-1238 Budapest (HU); László Mészáros, Erzsébet Út 51, 2030 Érd (HU); Antal Natta, Zalka Máté U 7, 2049 Diósd (HU); Antalné Natta, Zalka Máté U 7, 2049 Diósd (HU); Ferenc Natta, Bajcsy-Zsilinszki U 6, 2049 Diósd (HU)

( * ) Notice: Subject to any disclaimer, the term of this patent is extended or adjusted under 35 U.S.C. 154(b) by 193 days.

(21) Appl. No.: 10/489,724
(22) PCT Filed: Sep. 11, 2002
(86) PCT No.: PCT/HU02/00087

§ 371 (c)(1),
(2), (4) Date: Sep. 30, 2004

(87) PCT Pub. No.: WO03/022501

PCT Pub. Date: Mar. 20, 2003

(65) Prior Publication Data

US 2005/0040202 A1    Feb. 24, 2005

(30) Foreign Application Priority Data

Sep. 11, 2001    (HU) .................................... 0103647

(51) Int. Cl.
*B65H 51/10* (2006.01)
*B23K 9/133* (2006.01)
(52) U.S. Cl. ...................................... 226/187; 226/190
(58) Field of Classification Search ................ 226/186, 226/187, 189, 190, 176, 177, 1; 219/137.7
See application file for complete search history.

(56) References Cited

U.S. PATENT DOCUMENTS 3,016,451 A * 1/1962 Cornell .................. 219/137.44

(Continued)

FOREIGN PATENT DOCUMENTS

DE    29512235    11/1996

(Continued)

*Primary Examiner*—Peter M. Cuomo
*Assistant Examiner*—Scott Haugland
(74) *Attorney, Agent, or Firm*—Kolisch Hartwell, P.C.

(57) ABSTRACT

The wire feeder apparatus according to the invention has a carrying body (12), tubular guide elements fixed in the openings on the two opposite sides of the body determining a straight-line path for welding wire, further, two spatially separated feed rolls (33, 34) with parallel axles and provided with grooves on their curved surface fitting to the path of wire. The feed rolls (33, 34) are pivotally fixed on the mounting plate of the carrying body and they are individually connected to a gear-wheel via interlocking connection. A pressure arm (14) is fixed to the carrying body (12) by a turning joint, which pressure arm carries two pinch rollers (43, 44) having parallel axles with the feed rolls. A fixing arm is connected to the body (12) by a turning joint, in its one position the fixing arm elastically presses the pressure arm (14) to the body (12) and keeps it in this position, in one extreme, closed position of the pressure arm (14) that can be fixed by the fixing arm the pinch rollers (43, 44) are pressed to the feed rolls (33, 34) and connected to the feed rolls (33, 34) via forced driving coupling, in the other extreme position of the pressure arm (14) the pinch rollers (43, 44) are detached from the feed rolls (33, 34), and the gear-wheel (22) is situated between the feed rolls (33, 34). The pinch rollers are mounted on a self-adjusting device (42) fixed to the pressure arm. The apparatus has a guide-pulley (50) fixed to the self-adjusting device (42) between the pinch rollers (43, 44) in a way that it can freely revolve, and there is a welding wire guiding groove (51) running around the surface of this guide-pulley (50), and in the losed position of the pressure arm this wire guiding groove (51) fits to the path of wire.

3 Claims, 4 Drawing Sheets

U.S. PATENT DOCUMENTS

| | | |
|---|---|---|
| 3,331,545 A | 7/1967 | Oliveiri |
| 3,430,832 A * | 3/1969 | Meyer .................. 266/174 |
| 3,672,655 A * | 6/1972 | Carter .................. 266/108 |
| 3,746,232 A * | 7/1973 | Kirillov et al. .............. 226/187 |
| 5,370,290 A * | 12/1994 | Gilliland .................. 226/108 |
| 5,521,355 A * | 5/1996 | Lorentzen ................ 219/137.7 |
| 5,584,426 A * | 12/1996 | Ziesenis .................. 228/41 |
| 5,816,466 A | 10/1998 | Seufer |
| 6,388,234 B1 * | 5/2002 | Collins et al. ............ 219/137.7 |

FOREIGN PATENT DOCUMENTS

| | | |
|---|---|---|
| DE | 29915301 | 7/2000 |
| EP | 1016486 | 7/2000 |

* cited by examiner

WIRE FEEDING APPARATUS

The object of the invention is a wire feeding apparatus to be used for moving welding wire, especially as a unit of a welding apparatus to be used for unrolling welding wire from a wire spool and feeding the welding wire into the flexible cable of the welding torch and through the cable into the welding torch.

It is well known that the path of the welding wire in wire feeding apparatuses is established to be a straight-line path between the opening on the admission side and the opening on the exit side of the apparatus in terms of the direction of movement of the welding wire. The inlet section and the exit section of the path is defined by the bores in the tubular guide elements situated in the openings on the admission side and the exit side of the wire feeding apparatus. The path of the welding wire is further determined by the one or more spatially separated pairs of rolls, comprising a feed roll pivotally fixed on the body of the apparatus and a pinch roll pressing against the feed roll embedding the welding wire in the closed operating position of the feed roll and the pinch roll. In this position the pinch roll keeps the welding wire pushed in the groove on the surface of the driven feed roll, this way the rolls, embedding the welding wire, define a further point or rather a short section of the path of the welding wire, while the feed roll keeps moving the wire at a speed corresponding to the peripheral velocity of the feed roll. The length of the unguided part of the path of the welding wire, that is, the length of the path where the welding wire may be distorted, is attempted to be minimized by designing the tubular guide elements to be so long that the inner end of the tubular guide elements are positioned right beside the rolls.

Further, it is known that in case of wire feeding apparatuses with two pairs of rolls the welding wire is forwarded by rotating the driven feed rolls of the pairs of rolls at the same peripheral velocity. In spite of the fact that the points determining the path of the welding wire are collinear, it is a usual problem that due to inaccuracy of manufacture or due to tear and wear during usage or on any other reason the peripheral velocity of the driven feed rolls differ from each other, and in the disadvantageous case the welding wire is deformed between the two pairs of rolls, it is stretched or bent. Efforts are made to prevent bending of the welding wire by applying a further, internal tubular guide element situated between the pairs of rolls. Further difficulties arise if the welding wire is even slightly bent anywhere inside the wire feeding apparatus, the edge of opening of the next guide element in terms of the direction of movement of the welding wire shaves the welding wire while the bore of the guide element is abraded as well. In this case the material shaved from the welding wire stuffs the bore of the guide element and getting into the bore it further abrades the bore, as a result of which the guiding of the welding wire in the bore will be uncertain. The same is the situation if due to inaccuracy of manufacture or assembly the centre lines of the bores of the guide elements are not collinear, or if the angle between the centre lines of the bores is different from 180°. These disadvantageous effects increase each other and become more and more significant during usage, and result that the guiding of the welding wire in the tubular guide elements becomes uncertain and the wire is deformed or bent on its path inside the wire feeder apparatus. Sooner or later it results in bending of the welding wire to such an extent that the working process must be stopped, the wire feeding apparatus must be disassembled, the apparatus must be cleaned, the deformed welding wire must be smoothed out or cut, and it must be threaded through the wire feeding apparatus again and must be driven through the cable of the welding torch again. All these result in an undesired outage in the operation of the welding apparatus, and as it is extremely labour intensive and time consuming, it generates significant expenses.

The purpose of the known wire feeding apparatus with two pairs of rolls presented in U.S Pat. No. 5,816,466 is to solve this problem. This patent eliminates the above described problems by applying a guide plate assembly at the section between the tubular guide elements at the inlet and the exit sides of the path of the wire, the guide plate assembly having a guide slot in its one part and a cover part is pressing against the slot closing the welding wire in the slot this way. Accordingly, the welding wire is guided practically at its entire path inside the wire feeding apparatus. The welding wire is forced to move in the bore of the tubular guide element, the grooves of the feed rolls and the closed guiding groove of the guide plate element, leaving no space for distortion. As this construction prevents the welding wire from distortion, it meets the requirements, however, it has the disadvantage that the movement of the welding wire in slots practically at its entire path inside the apparatus goes with friction, the friction hinders the movement of the wire, it generates heat, decreasing the efficiency of the wire feeding apparatus. It is a further disadvantage that due to the friction, the surface layer of the welding wire may be abraded or at least it may become thinner at some places. At some types of welding wires this layer is established via electroplating or some other method so as to reduce the electric resistance of the welding wire, so it has special importance, and therefore if it is damaged or getting thinner it deteriorates the quality of the welding wire. Further, the material abraded from the wire must be removed from the slot of the guide assembly, which requires special care to prevent the occlusion of the guiding slot.

It is a further disadvantage of the construction that the wire feeding apparatus is a complicated mechanism, it is expensive to manufacture, its operation requires special attention and skilled labour.

The above discussed disadvantages made it necessary to find a construction for a wire feeding apparatus that ensures feeding of the welding wire without distortion and which eliminates the disadvantages of the above described constructions.

The basic idea of the invention is that if the distortion of the welding wire is prevented by guiding it in a groove, the friction between the welding wire and the walls of the groove can be minimized if the movement of the welding wire and the walls of the groove relative to each other is reduced to the minimum.

So the wire feeding apparatus according to the invention has a carrying body, tubular guide elements fixed in openings on two opposite sides of the carrying body determining a straight-line path for wire, further, it has two spatially separated feed rolls with parallel axles and provided with grooves on their curved surface fitting to the path of the wire, which feed rolls are pivotally fixed on the mounting plate of the carrying body and each feed roll is individually connected to a gear-wheel via interlocking connection, further, the gear-wheel is situated between the feed rolls, further, it has a pressure arm fixed to the carrying body by a turning joint, which pressure arm is supplied with two pinch rollers having parallel axles with the feed rolls, further, it has a fixing arm connected to the carrying body by a turning joint, in its one position the fixing arm elastically presses the pressure arm to the carrying body and keeps it in this position, in one extreme, closed position of the pressure arm that can be fixed by the fixing arm the pinch rollers are pressed to the feed rolls and are connected to the feed rolls via forced driving coupling, in the other extreme position of the pressure arm the pinch rollers are detached from the feed rolls, and the essential feature of the apparatus is that the pinch rollers are mounted on a self-adjusting device fixed to the pressure arm, further, the apparatus is supplied with a guide-pulley fixed to the self-adjusting device between the pinch rollers in a way that it can freely revolve, and there is a wire guiding groove running around the surface of this guide pulley, and in the closed position of the pressure arm this wire guiding groove fits to the path of wire.

The preferred embodiment of the wire feeding apparatus has a freely rotatable supporting roller fixed to the carrying body, having an axle parallel with the axles of the feed rolls, situated opposite to the guide-pulley in the closed position of the pressure arm, and in the closed position of the pressure arm the distance between the surface of the supporting roller and the surface of the guide-pulley is not greater than the diameter of the wire to be forwarded.

In the preferred embodiment of the wire feeding apparatus the self-adjusting device fixed to the pressure arm is a swinging lever.

The

Figure 1:
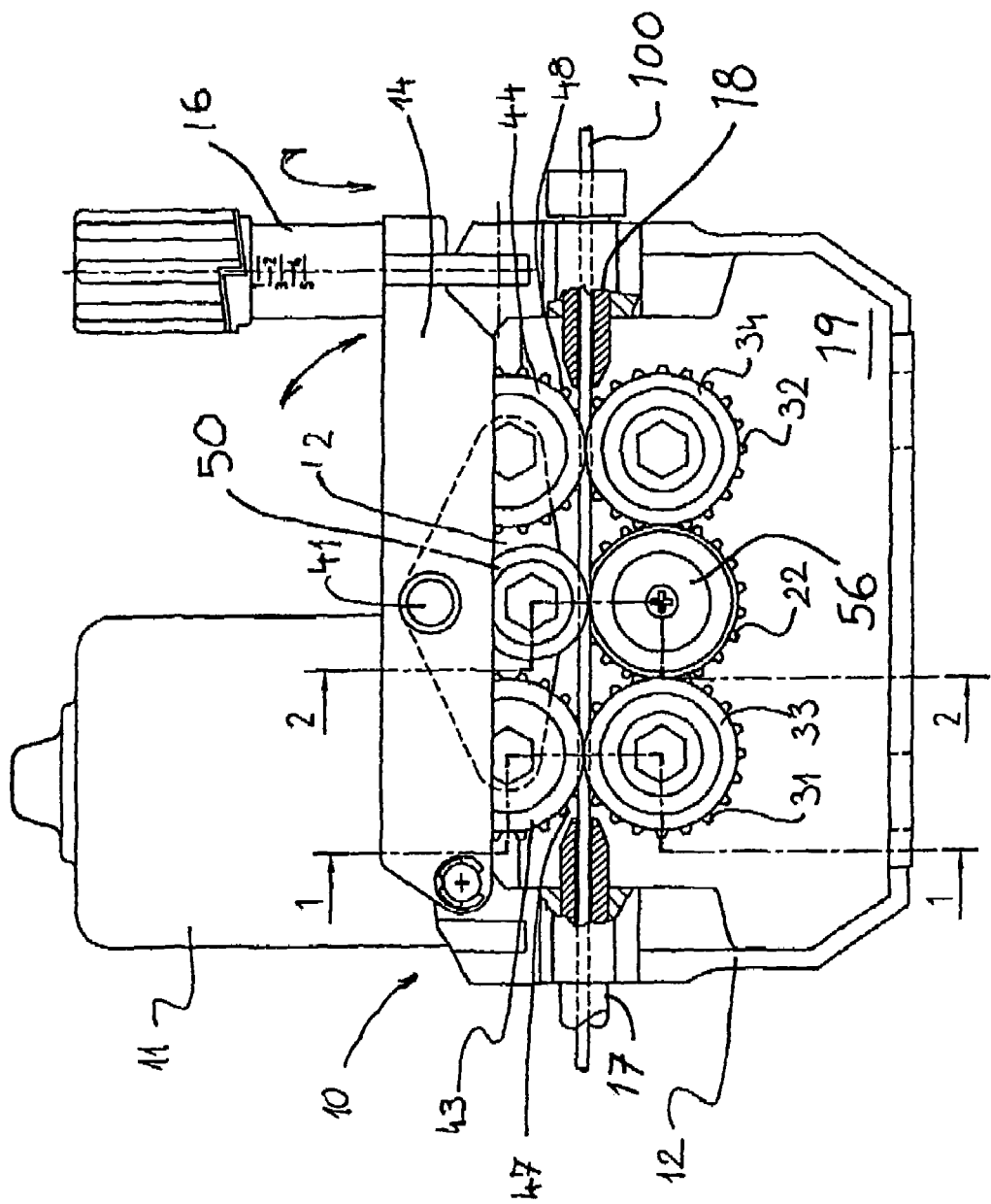
FIG. 1 shows the side view of a preferred embodiment of the wire feeding apparatus according to the invention with two pairs of rolls, supplied with a driving unit.
Figure 2:
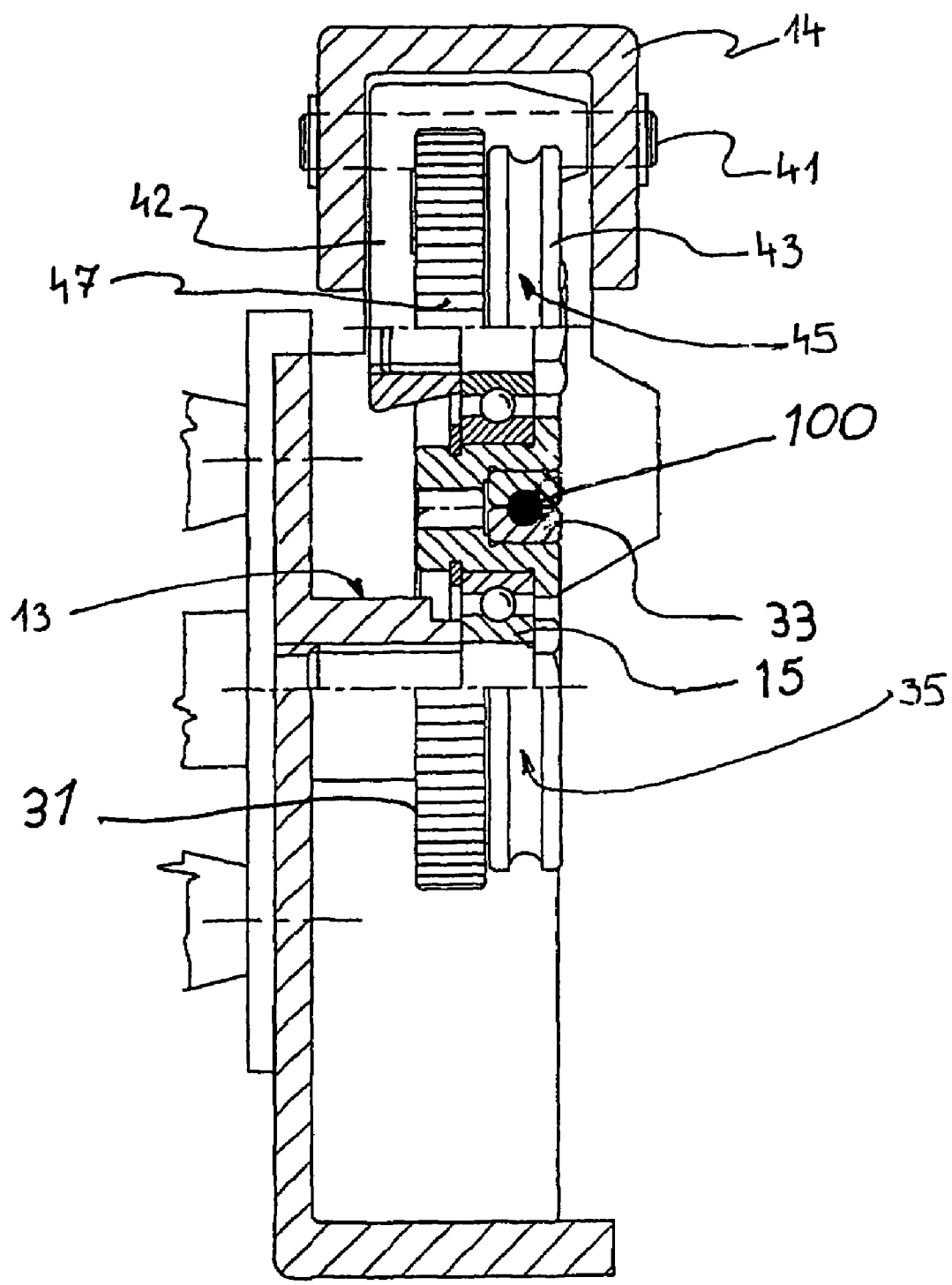
FIG. 2 is the stepped, broken-out sectional view of the wire feeding apparatus shown in FIG. 1 according to plane 1-1 indicated in FIG. 1.
Figure 3:
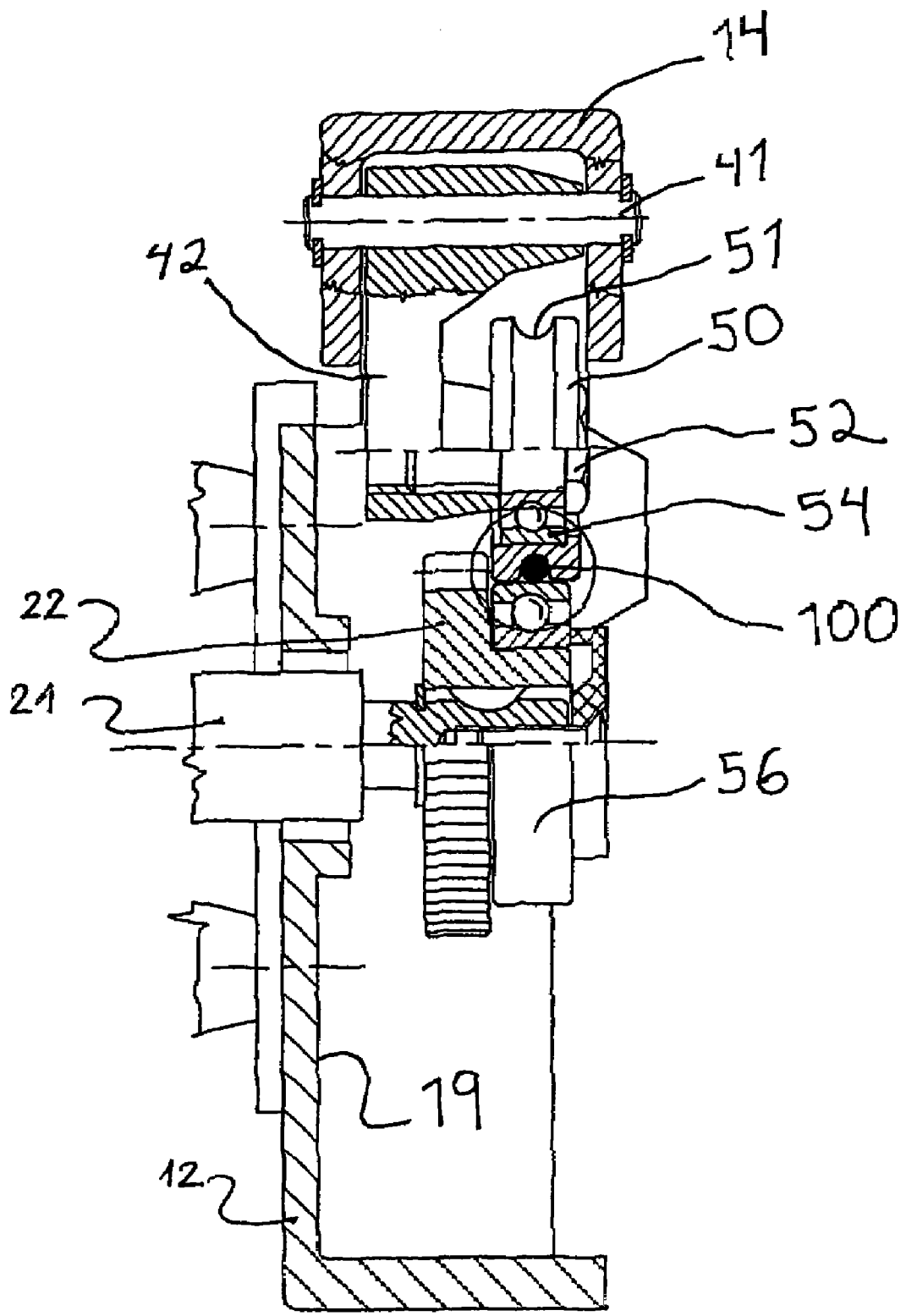
FIG. 3 is the stepped, broken-out sectional view of the wire feeder apparatus shown in FIG. 1 according to plane 2-2 indicated in FIG. 1.

The wire feeding apparatus 10 shown in FIG. 1 has a carrying body 12, the carrying body 12 has a front mounting plate 19 carrying the rolls, and on the opposite side of the carrying body 12 it has a rear surface. A driving motor and a driving unit with driving gear connected to it is fixed to the rear surface, out of which only the motor 11 is shown in the figure. The driving unit has a driving output shaft 21 and as can be seen in FIG. 3, the output shaft 21 of the driving unit is projecting through the carrying body 12 and projects from the mounting plate 19, and there is a gear-wheel 22 fixed on it via torque-transmission coupling. Reverting to the figure, there is a first and a second leg protruding from the mounting plate 19 of the carrying body 12 on the two sides of the gear wheel 22, parallel with the axle of the gear wheel 22, and there is a first driven gear 31 and a second driven gear 32 fixed to these legs via pivotal bearing. The driven gears 31 and 32 are of the same size and are joined to the gear-wheel 22 as it can be seen in FIG. 1. There is a ring shaped first feed roll 33 and a ring shaped second feed roll 34 of the same size fixed to the first and the second driven gears 31 and 32, and there are grooves for the welding wire in the surface of these feed rolls 33, 34. On the sectional view shown in FIG. 2 one can clearly see the first leg 13, the first pivot bearing 15 fixed to it via screw joint, the first driven gear 31 fixed to the outer ring of the pivot bearing 15, and the first feed roll 33, fixed to the first driven gear 31, provided with guide groove 35 running around its surface. As the driven gears 31 and 32, and the feed rolls 33 and 34 fixed to them are of the same size, driving them through gear-wheel 22 they rotate at the same peripheral velocity.

The pivot bearings are fixed to the first leg 13 and the second leg via detachable screw joint, while the driven gears 31 and 32 can be fixed to the outer ring of the pivot bearing by bonding or jamming, and the feed rolls 33 and 34 fixed to the driven gears 31 and 32 may be fixed by torque-transmission coupling e.g. cotter joint, jamming or bonding. The material of the feed rolls 33 and 34 having direct connection with the welding wire to be fed is hardened steel.

There is a pressure arm 14 fixed to the carrying body 12 at its corner opposite to the feed rolls 33 and 34 via pivotal bearing making free angular motion possible in the plain orthogonal to the axles of the feed rolls. There is a self-adjusting device connected to the pressure arm 14, which is a swinging lever 42 at this embodiment, which can freely turn around the pin 41 fixed to the pressure arm 14, as it can be seen if comparing FIG. 1 and FIG. 2. There are freely rotating pinch rollers 43 and 44 fixed to the swinging lever 42 on the two sides of the axis of rotation, at a distance from each other corresponding to the distance between the feed rolls.

The angular motion of the pressure arm 14, indicated by arrow in the figure, has two extreme positions, the so called open and closed position, the closed position is shown in the figure. The pressure arm 14 is pre-tensioned in the direction of the open position via elastic pre-tensioning not shown in the figure, and in the open position the pinch rollers 43 and 44 are in detached position from the feed rolls 33 and 34. In the other, so called closed extreme position of the pressure arm 14 as shown in the figure, the pinch rollers 43 and 44 are stressed in the direction of the feed rolls 33 and 34, and by the grooves running around the surface of the pinch rollers 43 and 44 at this embodiment, out of which the 45 groove of pinch roller 43 is shown in FIG. 2, they keep the welding wire positioned and elastically pushed in the guide groove in the curved surface of the feed rolls 33 and 34, out of which the groove 35 of the feed roll 33 is shown in FIG. 2. The pressure arm 14 is fixed in its closed position by fixing arm 16 locking the free end of the pressure arm 14 to the carrying body 12, the fixing arm 16 keeps the pressure arm 14 in this position with adjustable elastic force.

At other embodiments, e.g. in case of rollers designed for feeding thin welding wire, there are no grooves in the rollers.

Similarly to the feed rolls 33 and 34, the rings acting as pinch rollers 43 and 44 are connected to the first and second pressure gear 47 and 48 via torque-transmission coupling, and the pressure gears 47 and 48 are mounted on the swinging lever 42 via screw joint through a pivot bearing connected to the pressure gears 47 and 48, as can be seen in FIG. 1 and partially in FIG. 2. When feeding the welding wire 100, in the closed position of the pressure arm 14, the pressure rings of the pinch rollers 43, 44 are pressed to the corresponding feed rolls 33, 34 with the welding wire closed between them while keeping the welding wire pushed in the guide grooves, and also, the pressure gears 47, 48 forming one unit with the pressure rings are coupling with the driven gears 31, 32 connected to the corresponding feed rolls 33, 34, this way the pinch rollers 43, 44 are also driven, and as a result, the feeding of the wire will be more effective. FIG. 2 clearly shows the coupling of the driven gear 31 connected to feed roll 33 and the pressure gear 47 connected to pinch roller 43, and the mounting of the gear 47 to the swinging lever 42 by means of a pivot bearing making free rotation possible.

On the two sides of the carrying body 12 opposite to each other there are tubular guide elements 17 and 18 for introducing the welding wire, the axial bores of which are used for guiding the welding wire. The tubular guide elements 17 and 18 are penetrating in the inner space of the wire feeder apparatus on the two sides of the wire feeder apparatus, until the surface of the adjacent feed roll, conducting the welding wire to or from the adjacent feed roll.

To guide the welding wire between the feed rolls 33 and 34 there is a guide pulley 50 suitably positioned on the swinging lever 42 and fixed on it via free-running bearing, the axle of which is parallel to the axles of feed rolls 33 and 34. There is a guiding groove in the surface of the guide pulley 50 with its size corresponding to the size of the welding wire. In the closed position of the pressure arm 14 the path of the welding wire determined by the bore of the tubular guide element 17, the elementary section of the surface groove of the feed roll 33 adjoining to the pinch roller 43, the specific elementary section of the guiding groove in the surface of the guide pulley 50, the elementary section of the surface groove of the feed roll 34 adjoining to the pinch roller 44, and the bore of the tubular guide element 18 is a straight-line path.

The support for guiding the welding wire in the guiding groove 51 of the guide pulley 50 is the surface of a support roller 56 arranged opposite to the elementary section of the guiding groove at the path of wire, which sdupporting roller 56 is fixed to the shaft 21 of the driving unit via free-running bearing.

FIG. 2 is partly perspective view and partly sectional view of the wire feeding apparatus shown in FIG. 1 according to plane 1-1 indicated there. The figure clearly shows the feed roll 33 which is in forced driving coupling by a cotter joint with the driven gear 31 driven by the gear wheel 22 not shown in the figure. Further, the figure clearly shows the pivot bearing 15 making the driven gear 31 able to rotate. Further, one can clearly see the pinch roller 43 situated beside the feed roll 33, which pinch roller 43 is connected to the pressure gear 47 driven by the driven gear 31, and the swinging lever 42 carrying the pinch roller 43 and the pressure gear 42, which swinging lever 42 is fixed to the pressure arm 14. The figure clearly shows the surface groove 45 on the surface of the pinch roller 43 and the feed roll 33 which are closed in the closed position of the wire feeding apparatus, providing a stable catch for the welding wire 100. In the course of the rotation of the rollers at the same peripheral velocity, the welding wire is forwarded caught by the section of the grooves closed at that instant.

FIG. 3 is partly perspective view and partly sectional view of the wire feeding apparatus shown in FIG. 1 according to plane 2-2 indicated there. The figure clearly shows the swinging lever 42 pivotally fixed to the pressure arm 14 by the pin 41. The guide pulley 50 is fixed on a pivot bearing 54 mounted by screw joint in the swinging lever 42, which is therefore a free-running pulley. In the figure one can clearly see the guiding groove 51 in the surface of the guide pulley 50 suitable for accepting the welding wire 100, and as the welding wire 100 is advancing in the wire feeding apparatus, it rolls on in the guiding groove 51 in the surface of the guide pulley 50 without friction between the wall of the guiding groove 51 and the welding wire.

The figure also shows the supporting roller 56 situated opposite to the guide-pulley 50, which is embodied by a pivot-bearing at this example. The inner ring of the pivot-bearing acting as the supporting roller 56 is fixed to the shoulder on the driving wheel 22 mounted on the driving shaft 21 by cotter joint, while the outer ring is freely rotatable. The axle of the guide-pulley 50 and the supporting roller 56 is parallel and they are situated at such a distance that their surface does not contact, but the welding wire 100 in the guiding groove 51 of the guide-pulley 50 is closed by the supporting roller 56, this way the supporting roller 56 provides further guiding for the welding wire.

Figure 4:
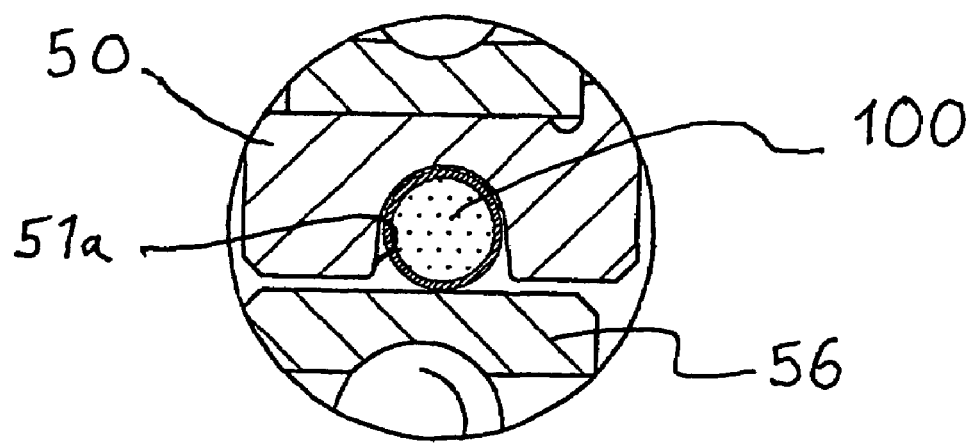
FIG. 4 is an enlarged view of the detail circled in FIG. 3.

FIG. 4 shows an enlarged view of the detail circled in FIG. 3. According to the embodiment depicted in FIG. 4, the welding wire 100 fits in a guiding groove 51*a* of the guide pulley 50, where guiding groove 51*a* is relatively deep, and is also supported by the supporting roller 56 which has a smooth surface. The distance between the bottom of the guiding groove 51*a* and the surface of the supporting roller 56 is less than the diameter of the welding wire 100.

Figure 5:
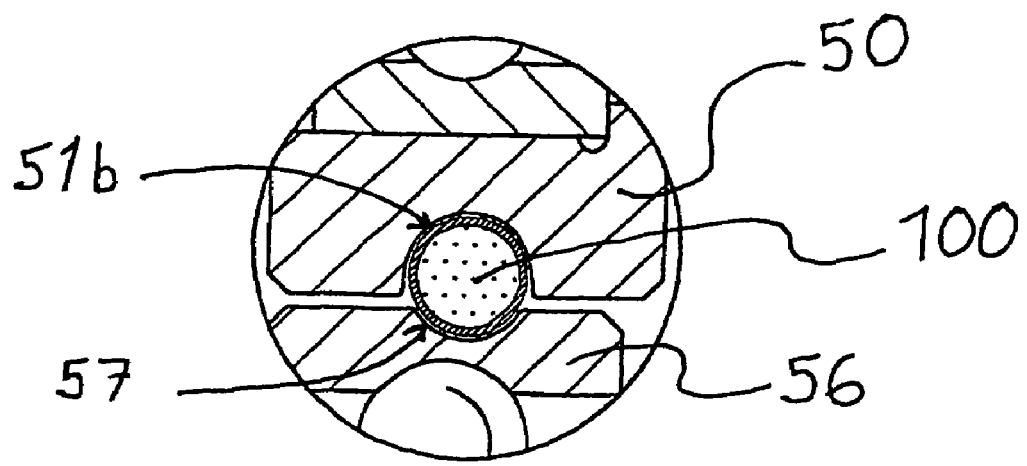
FIG. 5 shows another solution for the detail shown in FIG. 4.

FIG. 5 shows an enlarged view of the detail circled in FIG. 3, according to an alternative embodiment of the invention. According to the embodiment shown in FIG. 5, the supporting roller 56 includes a shallow positioning groove 57 around the curved surface of the roller opposite the guiding groove 51*b* of the guide pulley 50. The welding wire 100 is positioned in the guiding groove 51*b* of the guide pulley 50 and is supported in the positioning groove 57. The distance between the bottom of the guiding groove 51*b* and the bottom of the positioning groove 57 is less than the diameter of the welding wire 100.

The major advantage of the solution according to the invention is that it provides straight-line guiding for the welding wire in a way that friction is negligible, and therefore the efficiency of the wire feeder apparatus is improved, the velocity of the welding wire fed is more steady, while the possibility of deformation of the wire is reduced to the minimum. A further advantage of the solution is that as a consequence of reduced friction, the stripping of material from the surface of the welding wire while passing through the wire feeder apparatus is also reduced to minimum or there is no stripping at all, and therefore the layer established on the surface of some types of welding wire is less damaged.

The invention claimed is:

1. Wire feeder apparatus having a carrying body, the carrying body having two opposite sides, each side having an opening therein, with tubular guide elements fixed in the openings on the two opposite sides of the carrying body determining a straight-line path for welding wire, further, having two spatially separated feed rolls with parallel axles and provided with grooves on their curved surface fitting to the path of wire, which feed rolls are pivotally fixed on a mounting plate of the carrying body and each feed roll is individually connected to a gear-wheel via interlocking connection, further, having a pressure arm fixed to the carrying body by a turning joint, which pressure arm carries two pinch rollers having parallel axles with the feed rolls, further, having a fixing arm connected to the carrying body by a turning joint, in one position the fixing arm elastically presses the pressure arm to the carrying body and keeps it in this position, in one extreme, closed position of the pressure arm that can be fixed by the fixing arm the pinch rollers are pressed to the feed rolls and connected to the feed rolls via forced driving coupling, in the other extreme position of the pressure arm the pinch rollers are detached from the feed rolls, further, a gear-wheel is situated between the feed rolls, characterised in that the pinch rollers are mounted on a self-adjusting device fixed to the pressure arm, further, the apparatus has a guide-pulley fixed to the self-adjusting device between the pinch rollers in a way that it can freely revolve, and there is a welding wire guiding groove running around the surface of this guide-pulley, and in the closed position of the pressure arm this wire guiding groove fits to the path of wire.

2. Wire feeder apparatus according to claim 1, characterised in that it has a freely rotatable supporting roller fixed to the carrying body, having an axle parallel with the feed rolls, situated opposite to the guide-pulley in the closed position of the pressure arm, and in the closed position of the pressure arm the distance between the surface of the supporting roller and the surface of the guide-pulley is not greater than the diameter of welding wire to be forwarded.

3. Wire feeder apparatus according to any of claim 1 or claim 2, characterised in that the self-adjusting device fixed to the pressure arm is a swinging lever.

* * * * *